(12) United States Patent
Kasahara et al.

(10) Patent No.: US 10,901,209 B2
(45) Date of Patent: Jan. 26, 2021

(54) HEAD-UP DISPLAY DEVICE

(71) Applicant: NIPPON SEIKI CO., LTD., Niigata (JP)

(72) Inventors: Tsuyoshi Kasahara, Niigata (JP); Yuichi Takahashi, Niigata (JP)

(73) Assignee: NIPPON SEIKI CO., LTD., Niigata (JP)

(*) Notice: Subject to any disclaimer, the term of this patent is extended or adjusted under 35 U.S.C. 154(b) by 119 days.

(21) Appl. No.: 16/093,603

(22) PCT Filed: Apr. 13, 2017

(86) PCT No.: PCT/JP2017/015131
§ 371 (c)(1),
(2) Date: Oct. 12, 2018

(87) PCT Pub. No.: WO2017/183556
PCT Pub. Date: Oct. 26, 2017

(65) Prior Publication Data
US 2019/0121128 A1 Apr. 25, 2019

(30) Foreign Application Priority Data
Apr. 20, 2016 (JP) ................................ 2016-084594

(51) Int. Cl.
*G02B 27/01* (2006.01)
*B60K 35/00* (2006.01)
(52) U.S. Cl.
CPC .......... *G02B 27/0101* (2013.01); *B60K 35/00* (2013.01); *G02B 27/01* (2013.01);
(Continued)
(58) Field of Classification Search
CPC ............ B60K 35/00; B60K 2370/1529; B60K 2370/23; B60K 2370/332;
(Continued)

(56) References Cited

U.S. PATENT DOCUMENTS 6,052,236 A * 4/2000 Nakasuji ............... G02B 3/02
  235/462.42
6,111,701 A * 8/2000 Brown ............... G02B 27/0025
  359/634

(Continued)

FOREIGN PATENT DOCUMENTS

DE 102012218360 A1 4/2010
JP 2009-251194 A 10/2009
(Continued)

OTHER PUBLICATIONS

International Search Report issued in corresponding International Patent Application No. PCT/JP2017/015131, dated Jul. 11, 2017, with English Translation.
(Continued)

*Primary Examiner* — Balram T Parbadia
(74) *Attorney, Agent, or Firm* — McDermott Will & Emery LLP (57) ABSTRACT

The present invention suppresses an increase in optical system curvature, thereby enabling miniaturization. An image forming unit reflects image light beams, which were projected from each region along a first direction of a display, towards a reflection unit so that the image light beams intersect between the image forming unit and the reflection unit. A light distribution adjustment unit is disposed between a light source and a display, and in the first direction, adjusts the orientation of illumination light beams projected from the light source so that the illumination light beams are incident on the display as convergence light.

4 Claims, 6 Drawing Sheets

(52) U.S. Cl.
CPC .. *B60K 2370/1529* (2019.05); *B60K 2370/23* (2019.05); *B60K 2370/332* (2019.05); *B60K 2370/334* (2019.05); *G02B 2027/0118* (2013.01); *G02B 2027/0145* (2013.01)

(58) Field of Classification Search
CPC .......... B60K 2370/334; G02B 19/0014; G02B 19/0066; G02B 27/0101; G02B 27/0149; G02B 2027/0118; G02B 2027/0181; G02B 2027/0145; G02B 2027/015; G02B 2027/0154; G02B 27/01
See application file for complete search history.

(56) References Cited

U.S. PATENT DOCUMENTS

| | | | | |
|---|---|---|---|---|
| 2013/0063754 | A1* | 3/2013 | Saisho | G02B 19/0057 358/1.13 |
| 2013/0194674 | A1* | 8/2013 | Horiuchi | G02B 27/0101 359/631 |
| 2014/0022645 | A1* | 1/2014 | Matsuura | G02B 27/0101 359/626 |
| 2014/0063359 | A1* | 3/2014 | Chen | G02B 3/0006 349/11 |
| 2015/0092118 | A1* | 4/2015 | Hada | G02B 26/0833 349/11 |
| 2015/0260987 | A1 | 9/2015 | Weingarten et al. | |
| 2016/0282617 | A1 | 9/2016 | Asai | |
| 2017/0146798 | A1 | 5/2017 | Nambara | |

FOREIGN PATENT DOCUMENTS

| | | |
|---|---|---|
| JP | 2014-170112 A | 9/2014 |
| JP | 2015-534124 A | 11/2015 |
| JP | 2015-219425 A | 12/2015 |
| JP | 2015-232608 A | 12/2015 |
| WO | 2016/047621 A1 | 3/2016 |
| WO | 2016/092724 A1 | 6/2016 |

OTHER PUBLICATIONS

Supplementary European Search Report dated Oct. 16, 2019, issued in corresponding European Patent Application No. 17785895.8.

* cited by examiner

Prior Art

HEAD-UP DISPLAY DEVICE

CROSS REFERENCE

This application is the U.S. National Phase under 35 U.S.C. § 371 of International Application No. PCT/JP2017/015131, filed on Apr. 13, 2017, which claims the benefit of Japanese Application No. 2016-084594, filed on Apr. 20, 2016, the entire contents of each are hereby incorporated by reference.

TECHNICAL FIELD

The present invention relates to a head-up display device for viewing a virtual image superimposed on the actual view.

BACKGROUND ART

Figure 9:
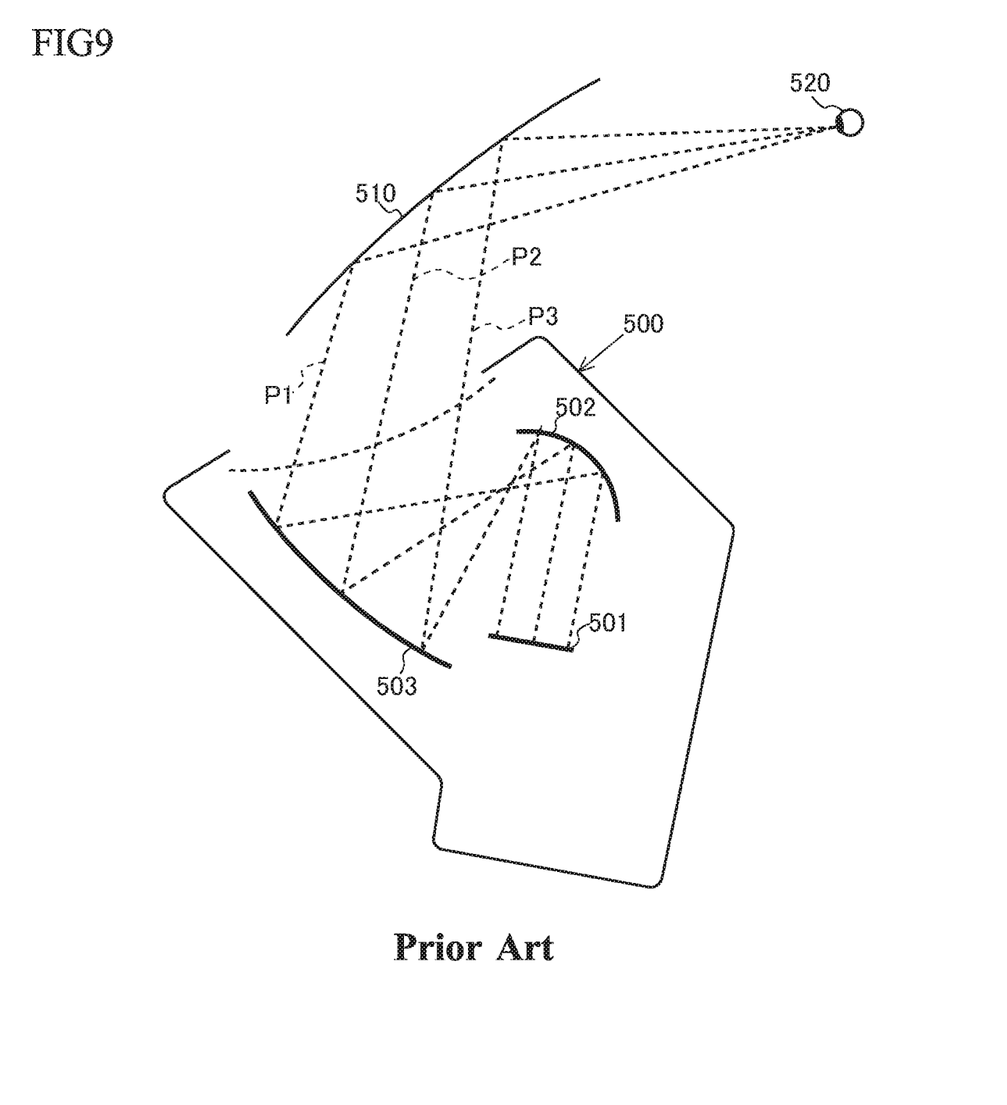
FIG. 9 is a schematic configuration diagram of a conventional head-up display device.

Patent Literature 1 describes a conventional head-up display (HUD: Head-Up Display) device. As shown in FIG. 9, in a HUD device 500, image light beams P1, P2, P3 are emitted from regions of a display 501, the image light beams P1, P2, P3 from the display 501 are reflected by a first reflector 502 constituted by a concave mirror, and the image light beams P1, P2, P3 having been reflected by the first reflector 502 are reflected by a second reflector 503 constituted by a concave mirror to a transmissive reflector 510 in front of a viewer 520. In FIG. 9, the image light beams P1, P2, P3 are principal rays with the highest light intensity among countless rays emitted from the regions of the display 501, and other rays are omitted.

In particular, in the HUD device 500 described in Patent Literature 1, the first reflector 502 makes the image light beams P1, P2, P3 emitted from the regions of the display 501 cross with each other between the first reflector 502 and the second reflector 503. As the first reflector 502 makes the image light beams P1, P2, P3 emitted from the regions of the display 501 cross with each other between the first reflector 502 and the second reflector 503, optical paths of the image light beams P1, P2, P3 can be made compact and thus the entire HUD device 500 can be made compact accordingly.

CITATION LIST

Patent Literature

Patent Literature 1: Japanese Unexamined Patent Application Publication No. 2015-534124

SUMMARY OF THE INVENTION

Problems to be Solved by the Invention

When the image light beams P1, P2, P3 emitted from the regions of the display 501 are made to cross with each other between the first reflector 502 and the second reflector 503, however, the first reflector (optical system) 502 must have a concave shape with a large curvature. Consequently, the virtual image generated by the HUD device 500 may be easily distorted or it may be difficult to manufacture a concave mirror with a large curvature.

The present invention has been achieved in view of the above problems, and an object of the invention is to provide a head-up display device that prevents an increase in the curvature of an optical system, while achieving compactness of the device, which is an initial object.

In order to achieve the above object, there is provided a head-up display device comprising a light source (11, 21) that emits an illumination light beam (200), a display (14, 24) that receives the illumination light beam (200) on a rear surface and emits an image light beam (100) having been modulated from a front surface, a light distribution adjustment unit (12, 22) that is disposed between the light source (11, 21) and the display (14, 24) and adjusts distribution of the illumination light beam (200) entering the display (14, 24), an image forming unit (15) that images the image light beam (100) emitted from the display (14, 24), and a reflector (16) that reflects the image light beam (100) having passed through the image forming unit (15) to a transmissive reflector (2) disposed in front of a viewer. The image forming unit (15) reflects image light beams (101, 102, 103) emitted from regions of the display (14, 24) arranged in a first direction (Y) so as to make the image light beams cross with each other between the image forming unit and the reflector (16), and the light distribution adjustment unit (12, 22) makes the illumination light beam (201, 202, 203) enter the display (14, 24) as converging light in the first direction (Y).

Effect of the Invention

The present invention can prevent an increase in the curvature of an optical system, thus achieving compactness of the device.

BRIEF DESCRIPTION OF THE DRAWINGS

FIG. 8(*a*) is a schematic configuration diagram of a display device in a modification of the present invention, as viewed from the second direction.

FIG. 8(*b*) is a schematic configuration diagram of the display device in the modification of the present invention, as viewed from the first direction.

MODE FOR CARRYING OUT THE INVENTION

Embodiments of the present invention will be described with reference to the drawings.

Figure 1:
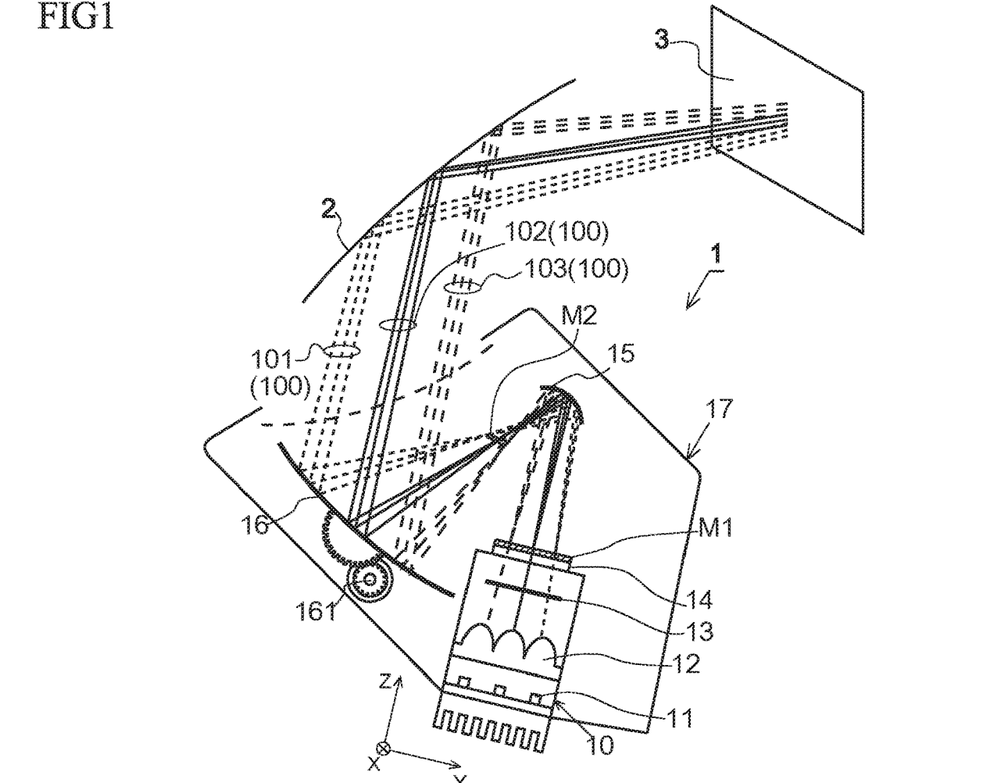
FIG. 1 is a schematic configuration diagram of a head-up display device according to a first embodiment of the present invention.

FIG. 1 is a schematic configuration diagram showing a configuration of a head-up display device (hereinafter, "HUD device") 1 according to the present embodiment. The HUD device 1 according to the present embodiment is installed in the dashboard of a vehicle. The HUD device 1 generates a display image M1, which is a real image, and emits an image light beam 100 of the display image M1 to a window shield 2 of the vehicle. The image light beam 100 reflected on the window shield 2 is directed to an eye box 3. A user (viewer) sets the view point position in the eye box 3 to view a virtual image of the display image M1. The user recognizes the virtual image through the window shield 2 as being superimposed on the actual view of the front of the vehicle and being far from the vehicle. For easy understanding of the embodiments of the present invention, it is assumed in the drawings used for the description that the first direction on the display surface of a display 14 (24) to be described later is a Y axis, the direction orthogonal to the first direction Y on the display surface of the display 14 (24) is an X axis, and the direction orthogonal to the first direction Y and the second direction X (typically, the direction of the optical axis of the image light beam 100 emitted from the display 14 (24)) is a Z axis.

As shown in FIG. 1, the HUD device 1 includes a display device 10 (20) that displays the display image M1 and emits the image light beam 100 representing the display image M1, a first reflector (image forming unit) 15 that reflects the image light beam 100 emitted from the display device 10, a second reflector 16 that magnifies the image light beam 100 reflected by the first reflector 15 and directs the magnified image light beam to the window shield 2, a casing 17 that accommodates these components, and a controller (not shown) that electrically controls the HUD device 1. In the HUD device 1 according to the present invention, the first reflector 15 to be described later makes image light beams 100 (101, 102, 103) emitted from regions of the display device 10 along the first direction Y cross with each other. The optical path of the image light beam 100 between the first reflector 15 and the second reflector 16 can be made compact and thus the HUD device 1 itself can be made compact accordingly.

The display device 10 (20) in the HUD device 1, which will be descried below, receives an illumination light beam 200 from a light source 11 (21) on its rear surface and emits the modulated image light beam 100 from its front surface. In the display device 10 (20) of the present invention, the direction of the principal ray of the image light beam 100 differs for each region where the image light beam 100 is emitted. Specifically, the principal rays of the image light beams 100 (101, 102, 103) emitted from the regions arranged along the first direction Y are emitted to converge on a YZ plane in the display device 10 (20) (see FIG. 3). In addition, the principal rays of the image light beams 100 (104, 105, 106) emitted from regions arranged along the second direction X orthogonal to the first direction Y are emitted to scatter on an XZ plane in the display device 10 (20) (see FIG. 4). The principal ray referred herein is defined as a ray passing through the center of beam of light emitted from a predetermined point, and typically, is a ray with the highest light intensity of the beam of light emitted from the predetermined point.

Figure 2:
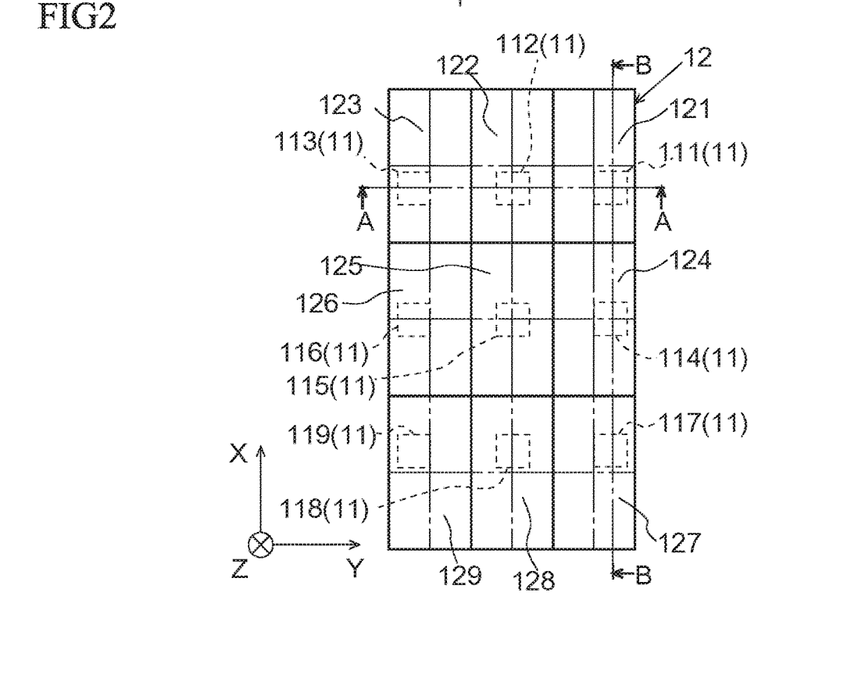
FIG. 2 is an explanatory diagram of an arrangement of a light source and a lens array in the first embodiment, showing the lens array as viewed from the front.
Figure 3:
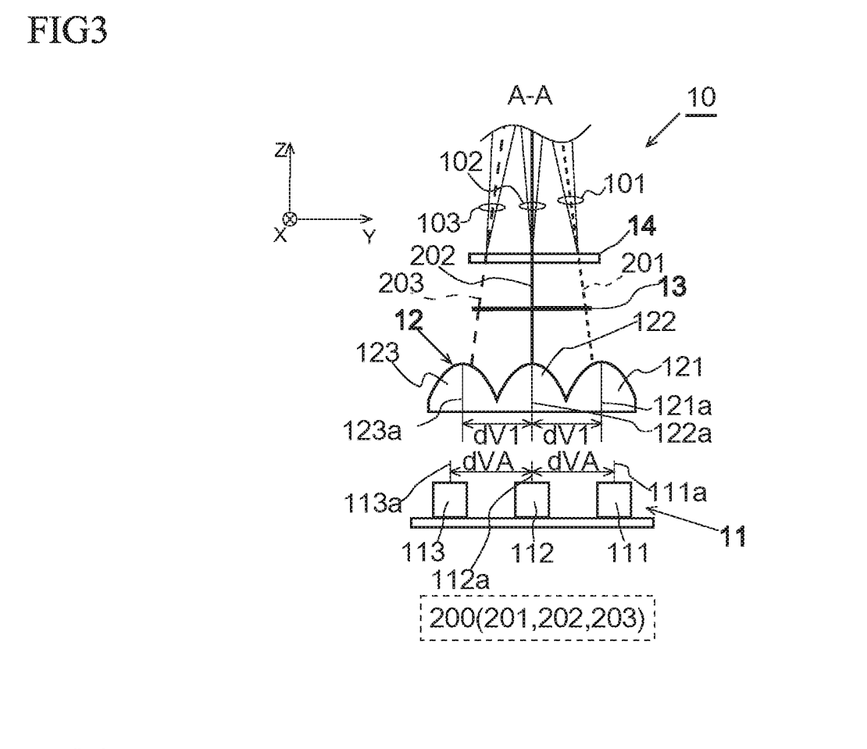
FIG. 3 is a schematic configuration diagram of a display device in the first embodiment, as viewed from a second direction.
Figure 4:
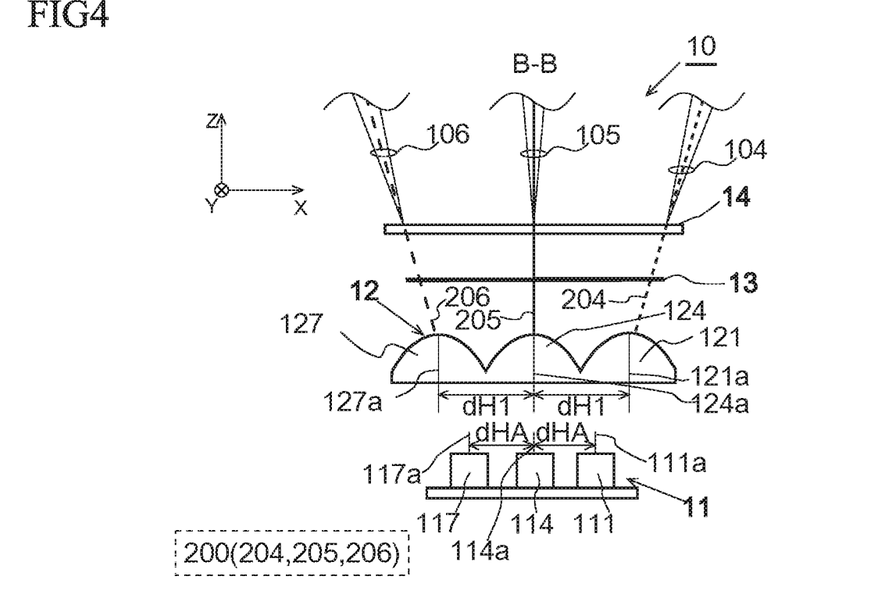
FIG. 4 is a schematic configuration diagram of the display device in the first embodiment, as viewed from a first direction.

A configuration of the display device 10 in the HUD device 1 according to the first embodiment is described below with reference to FIGS. 2 to 4. FIG. 2 is an explanatory diagram of an arrangement of the light source 11 and a lens array 12 in the display device 10 according to the first embodiment, showing the lens array 12 as viewed from the front. FIG. 3 is a cross-sectional view of the display device 10 taken along the YZ plane, that is, a cross-sectional view taken along a line A-A of FIG. 2. FIG. 4 is a cross-sectional view of the display device 10 taken along the XZ plane, that is, a cross-sectional view taken along a line B-B of FIG. 2.

Display Device 10 According to First Embodiment

As shown in FIGS. 3 and 4, the display device 10 according to the first embodiment includes the light source 11 that emits the illumination light beam 200, the lens array 12 that is constituted by a plurality of condenser lenses 121 to 129 for condensing the illumination light beam 200 emitted from the light source 11, a diffusion plate 13 that diffuses the illumination light beam 200 emitted from the lens array 12, and the display 14 that receives the illumination light beam 200 on its rear surface, modulates the illumination light beam 200, and displays the display image M1 on its front surface. That is, the display device 10 emits the image light beam 100 representing the display image M1 from each region on the surface of the display 14.

The light source 11 is constituted by a plurality of light sources 111 to 119 that can output white light, such as LEDs, and is controlled by the controller to emit the illumination light beam 200. The light sources 11 are arranged in a first pitch dVA in a direction along the first direction Y and in a third pitch dHA in a direction along the second direction X. Specifically, the light source 11 is constituted by nine light sources 111 to 119 in total, which are arranged in three rows in the direction along the first direction Y and in the direction along the second direction X.

The lens array (light distribution adjustment unit) 12 emits the illumination light beam 200 entering in the first direction Y as converging light and the illumination light beam 200 entering in the second direction X orthogonal to the first direction Y as scattering light. For example, the lens array 12 is formed by integrating the condenser lenses 121 to 129 corresponding to the light sources 11, respectively. The lens arrays 12 are arranged in a second pitch dV1, which is smaller than the first pitch dVA of the light source 11, in the first direction Y and in a fourth pitch dH1, which is larger than the third pitch dHA of the light source 11, in the second direction X. The light lens array 12 is constituted by nine condenser lenses 121 to 129 in total, which are arranged in three rows in the direction along the first direction Y and in the direction along the second direction X.

An operation of the lens array (light distribution adjustment unit) 12 is described below with reference to FIGS. 3 and 4. The image light beams 100 (101, 102, 103) emitted from the display 14 shown in FIG. 3 form the virtual image viewed by a viewer in a vertical direction. The image light beam 101 forms a lower end of the virtual image, the image light beam 102 forms the substantially vertical center portion of the virtual image, and the image light beam 103 forms an upper end of the virtual image. In addition, the image light beams 100 (104, 105, 106) emitted from the display 14 shown in FIG. 4 form the virtual image viewed by the viewer in a horizontal direction. The image light beam 104 forms a right end of the virtual image, the image light beam 105 forms the substantially horizontal center portion of the virtual image, and the image light beam 106 forms a left end of the virtual image.

Operation of Lens Array (Light Distribution Adjustment Unit) 12

The lens array 12 (light distribution adjustment unit) is operated in a manner that the principal rays of the illumination light beams 201, 202, 203 entering the regions of the lens array 12 along the first direction Y enter the display 14 in a converging manner, whereas the principal rays of the illumination light beams 204, 205, 206 entering the regions of the lens array 12 along the second direction X orthogonal to the first direction Y enter the display 14 in a scattering manner. That is, the lens array (light distribution adjustment unit) 12 adjusts the incident angle of the illumination light beam 200 entering the display 14. The lens array 12 also has a function of magnifying the exit pupil of the illumination light beam 200 entering from the light source 11.

Referring to FIG. 3, optical axes 121a, 123a of the condenser lenses 121, 123 arranged along the first direction Y are disposed to be closer to the optical axis of the lens array 12 in the first direction Y than optical axes 111a, 113a of the light sources 111, 113. The illumination light beams 200 (201, 202, 203) emitted from the light sources 11 are emitted as the converging light from the lens array 12 to the diffusion plate 13, pass through the diffusion plate 13, and then enter the rear surface of the display 14 as the converging light in the first direction Y. As the illumination light beam 200 is further spaced apart from the optical axis of the lens array 12 in the first direction Y, the light distribution adjustment unit 12 increases the amount of adjustment (the inclined angle) of the illumination light beam 200. The optical axis of the lens array 12 in the first direction Y is the center of beam of light of the illumination light beam 200 emitted from the lens array 12 in the first direction Y and typically, is the optical axis 122a of the condenser lens 122, which is the center of the lens array 12 in the first direction Y.

Referring to FIG. 4, optical axes 121a, 127a of the condenser lenses 121, 127 arranged along the second direction X are disposed to be further away from the optical axis 124a of the lens array 12 than optical axes 111a, 117a of the light sources 111, 117. The illumination light beams 200 (204, 205, 206) emitted from the light sources 11 are emitted as the scattering light from the lens array 12 to the diffusion plate 13, pass through the diffusion plate 13, and then enter the rear surface of the display 14 as the scattering light in the second direction X. As the illumination light beam 200 is further spaced apart from the optical axis of the lens array 12 in the second direction X, the light distribution adjustment unit 12 increases the amount of adjustment (the inclined angle) of the illumination light beam 200. The optical axis of the lens array 12 in the second direction X is the center of beam of light of the illumination light beam 200 emitted from the lens array 12 in the second direction X and typically, is the optical axis 124a of the condenser lens 124, which is the center of the lens array 12 in the second direction X.

The diffusion plate 13 is, for example, a diffusion film composed of a resin such as polycarbonate, and emits the illumination light beam 200 obtained by diffusing the illumination light beam 200 emitted from the lens array 12 over a fixed distribution. Directions of the principal rays of the diffused illumination light beams 200 emitted from regions on the front surface of the diffusion plate 13 are substantially aligned with directions of principal rays of the illumination light beams 200 emitted from the lens array 12 to regions on the rear surface of the diffusion plate 13. In the first direction Y, the diffusion plate 13 diffuses the illumination light beams 200 (201, 202, 203) entering the rear surface of the diffusion plate 13 in a converging manner and emits the illumination light beams 200 so as to converge from the front surface of the diffusion plate 13. In the second direction X, the diffusion plate 13 diffuses the illumination light beams 200 (204, 205, 206) entering the rear surface of the diffusion plate 13 in a scattering manner and emits the illumination light beams 200 so as to scatter from the front surface of the diffusion plate 13.

The display 14 is a transmissive display that receives the illumination light beam 200 on its rear surface and emits the image light beam 100 representing the display image M1, which is obtained by modulating the illumination light beam 200, from its front surface. The display 14 is, for example, a liquid crystal display such as an LCD. The illumination light beam 200, which is the converging light in the first direction Y and is the scattering light in the second direction X, enters the rear surface of the display 14. The display 14 thus emits the image light beam 100, which is the converging light in the first direction Y and is the scattering light in the second direction X, from its front surface to the first reflector 15.

In the first reflector (image forming unit) 15, the refractive power of a reflecting surface for reflecting a converging light component of the image light beam 100 is larger than the refractive power of a reflecting surface for reflecting a scattering light component of the image light beam 100. That is to say, the refractive power of the first reflector 15 on the YZ plane shown in FIG. 1 is larger than the refractive power of the first reflector 15 on the ZX plane. The first reflector (image forming unit) 15 has a positive refractive power on the YZ plane, and images the converging light component of the image light beam 100 as an intermediate image M2 between the first reflector 15 and the second reflector 16. In addition, the first reflector 15 has a positive or negative refractive power on the XZ plane, and does not image the converging light component of the image light beam 100 as the intermediate image between the first reflector 15 and the second reflector 16. Specifically, the reflecting surface of the first reflector 15 on the YZ plane and the XZ plane is a concave free-form surface, and the curvature of the reflecting surface of the first reflector 15 on the YZ plane is larger than the curvature of the reflecting surface of the first reflector 15 on the XZ plane. In addition, the first reflector 15 may also have a function of reducing the distortion of the virtual image generated by the HUD device 1. In the HUD device 1 according to the present invention, the display device 10 (the display device 20 to be described later) emits the image light beams 100 (101, 102, 103) whose principal rays travel in the converging direction from regions along the first direction Y, and thus the refractive power of the reflecting surface that makes the image light beams 100 (101, 102, 103) cross with each other can be reduced. That is to say, the curvature of the first reflector 15 that makes the image light beams 100 (101, 102, 103) cross with each other can be reduced. Moreover, in the first direction Y, the image light beam 100 travels from the display device 10 (20) in the converging direction, and thus the optical path of the image light beam 100 in the first direction Y can be made compact. Consequently, it is possible to reduce the size of the first reflector 15 that receives the image light beam 100 travelling in the converging direction from the display device 10 (20).

The second reflector 16 includes a reflecting surface, which is a concave free-form surface, and its detailed surface shape is calculated based on the positional relationship between the display 14, the first reflector 15, the window shield 2 (a reflective-transmissive surface), and the eye box 3, the curvature of the window shield 2, the imaging distance of a virtual image required, the angle of view of the HUD device 1 for user's view, and the like. The second reflector 16 may be designed to minimize the distortion of the virtual image. In addition, the second reflector 16 magnifies the image light beam 100 reflected by the first reflector 15 to reflect the image light beam 100 magnified to the window shield 2.

The second reflector 16 also includes an actuator 161 capable of rotating and/or moving the second reflector 16. The actuator 161 rotates the second reflector 16 based on the view point position of a viewer detected by a view point position detector constituted by a camera (not shown) or the like to move the eye box 3 to which the image light beam 100 is directed. The display device 10 may adjust the direction of an optical axis emitted from the display 14 by rotating and/or moving the entire display device 10 and/or the lens array (light distribution adjustment unit) 12 in response to driving of the second reflector 16.

Figure 5:
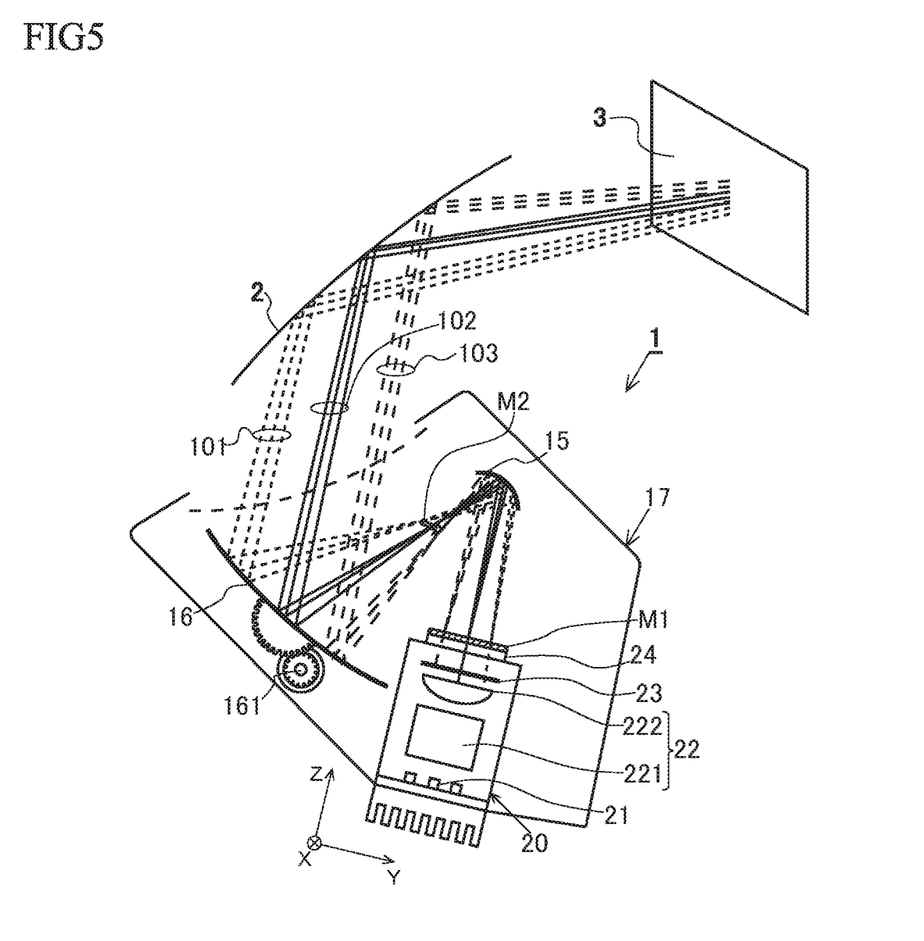
FIG. 5 is a schematic configuration diagram of a head-up display device according to a second embodiment of the present invention.

The HUD device 1 according to the first embodiment of the present invention has been described above. An HUD device 1 according to a second embodiment of the present invention is described below with reference to FIGS. 5 to 7. The HUD device 1 according to the first embodiment is different from the HUD device 1 according to the second embodiment, in that while the lens array (light distribution adjustment unit) 12 of the first embodiment has the function of magnifying the exit pupil of the illumination light beam 200 and the function of adjusting the incident angle of the illumination light beam 200 entering the display 14, a light distribution adjustment unit 22 of the second embodiment is constituted by, as shown in FIG. 5, an exit pupil magnifier 221 having the function of magnifying the exit pupil of the illumination light beam 200 and a light distribution adjustment lens 222.

Display Device 20 According to Second Embodiment

Figure 6:
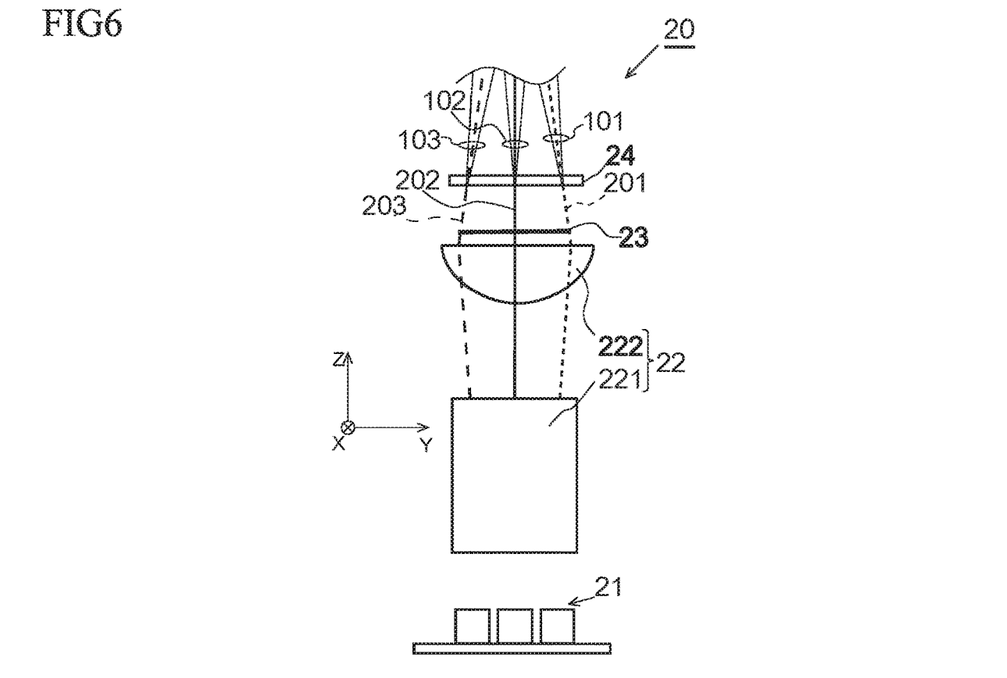
FIG. 6 is a schematic configuration diagram of a display device in the second embodiment, as viewed from the second direction.
Figure 7:
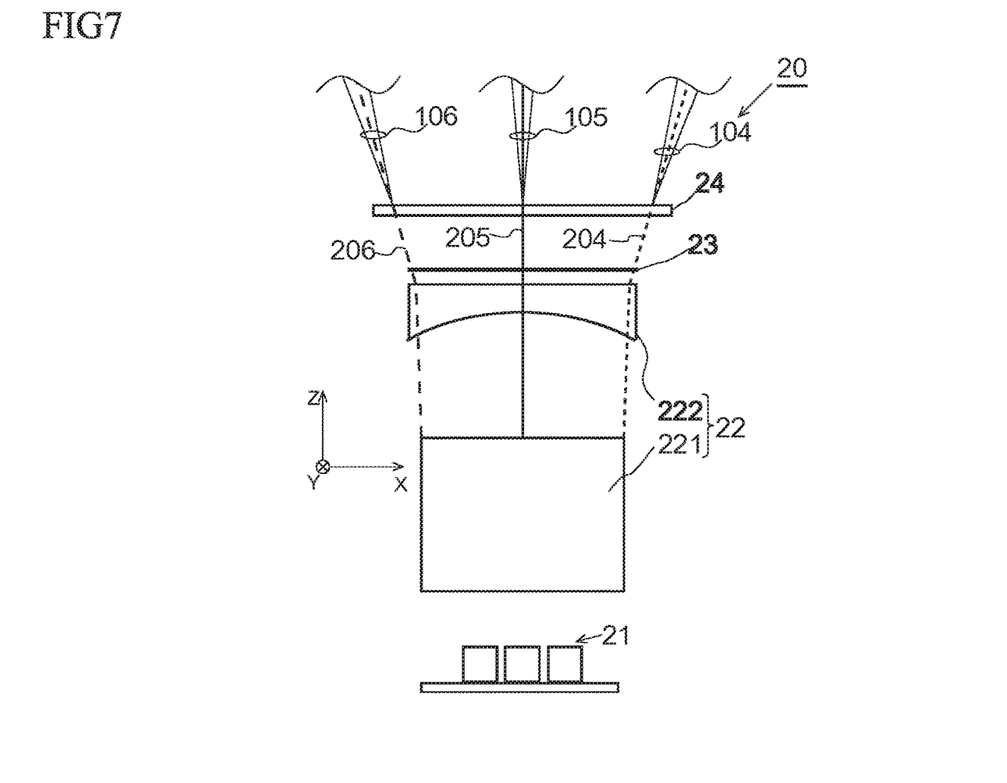
FIG. 7 is a schematic configuration diagram of the display device in the second embodiment, as viewed from the first direction.

As shown in FIGS. 6 and 7, the display device 20 according to the second embodiment includes a light source 21 that emits the illumination light beam 200, the light distribution adjustment unit 22 that adjusts distribution of the illumination light beam 200 entering the display 14, a diffusion plate 23 that diffuses the illumination light beam 200 emitted from the light distribution adjustment unit 22, and the display 24 that receives the illumination light beam 200 on its rear surface, modulates the illumination light beam 200, and displays a display image M1 on its front surface. The display device 10 emits the image light beam 100 representing the display image M1 from each region on the front surface of the display 24. The light source 21, the diffusion plate 23, and the display 24 according to the second embodiment correspond to the light source 11, the diffusion plate 13, and the display 14 according to the first embodiment, respectively, and thus descriptions thereof will be omitted.

The light distribution adjustment unit 22 according to the second embodiment includes, for example, the exit pupil magnifier 221 that magnifies the exit pupil of the illumination light beam 200 entering from the light source 21 and the light distribution adjustment lens 222 that adjusts the incident angle of the illumination light beam 200 entering the display 14.

The exit pupil magnifier 221 is constituted by, for example, a double microlens array (not shown) in which microlenses are arranged in a matrix on its front and rear surfaces, a first mirror tunnel (not shown) that includes a reflecting surface on its interior surface, and openings on its side of the light source 21 and its side of the light distribution adjustment lens 222, a second mirror tunnel (not shown) constituted by the first mirror tunnel, a concave lens, with its side of the light source 21 being concave, that is disposed in the opening of the first mirror tunnel near the light source 21, and a lens array, with its side of the light distribution adjustment lens 222 being convex, that is disposed in the opening of the first mirror tunnel near the light distribution adjustment lens 222, or the like. It is only required that the exit pupil magnifier 221 magnifies the exit pupil of the illumination light beam 200, and thus conventional exit pupil magnifiers may be used.

The light distribution adjustment lens 222 has a positive refractive power in the first direction Y and a negative refractive power in the second direction X. The light distribution adjustment lens 222 has a convex light receiving surface in the first direction Y, which is shown in FIG. 6, and a concave light receiving surface in the second direction X, which is shown in FIG. 7.

An operation of the light distribution adjustment unit 22 according to the second embodiment is described below with reference to FIGS. 6 and 7.

Operation of Light Distribution Adjustment Lens 222

The light distribution adjustment lens 222 is operated in a manner that the principal rays of the illumination light beams 201, 202, 203 entering the regions of the light distribution adjustment lens 222 along the first direction Y enter the display 24 in a converging manner, whereas the principal rays of the illumination light beams 204, 205, 206 entering the regions of the light distribution adjustment lens 222 along the second direction X orthogonal to the first direction Y enter the display 24 in a scattering manner. That is, the light distribution adjustment lens 222 adjusts the incident angle of the illumination light beams 201 to 206 entering the display 24.

With reference to FIG. 6, the illumination light beams 200 (201, 202, 203) emitted from the regions of the exit pupil magnifier 221 along the first direction Y are refracted by the light distribution adjustment lens 222, emitted as the converging light from the light distribution adjustment lens 222 to the diffusion plate 23, pass through the diffusion plate 23, and then enter the rear surface of the display 24 as the converging light. As the illumination light beams 201, 202, 203 are further spaced apart from the optical axis of the light distribution adjustment lens 222 in the first direction Y, the light distribution adjustment lens 222 increases the amount of adjustment (the inclined angle) of the illumination light beams 201, 202, 203.

With reference to FIG. 7, the illumination light beams 200 (204, 205, 206) emitted from the regions of the exit pupil magnifier 221 along the second direction X are refracted by the light distribution adjustment lens 222, emitted as the scattering light from the light distribution adjustment lens 222 to the diffusion plate 23, pass through the diffusion plate 23, and then enter the rear surface of the display 24 as the scattering light. As the illumination light beams 204, 205, 206 are further spaced apart from the optical axis of the light distribution adjustment lens 222 in the first direction Y, the light distribution adjustment lens 222 increases the amount of adjustment (the inclined angle) of the illumination light beams 204, 205, 206.

The light distribution adjustment lens 222 may have a surface with a positive refractive power in the first direction Y and a surface with a negative refractive power in the second direction X on its light receiving surface (a surface in a negative direction of a third direction Z) and on its emitting surface (a surface in a positive direction of the third direction Z), respectively. Alternatively, the light distribution adjustment lens 222 may have the surface with a positive refractive power in the first direction Y and/or the surface with a negative refractive power in the second direction X on both the light receiving surface (the surface in the negative direction of the third direction Z) and the emitting surface (the surface in the positive direction of the third direction Z). In addition, the light distribution adjustment lens 222 may be formed by, for example, perpendicularly arranging a cylindrical lens with a positive refractive power (first light distribution adjustment lens) and a cylindrical lens with a negative refractive power (second light distribution adjustment lens). Moreover, the light distribution adjustment lens 222 may be constituted by a lens group including a plurality of lenses (first light distribution adjustment lens and second light distribution adjustment lens).

Modification

While the HUD device 1 according to the second embodiment of the present invention has been described above, the present invention is not limited to the embodiments described above and the drawings. Alterations (including removal of constituent elements) may be appropriately made without departing from the spirit and scope of the invention. An example of the modification is described below.

While the image forming unit 15 is constituted by reflection optics (the first reflector 15) that reflects the image light beam 100 to the second reflector 16 in the first and second embodiments, refraction optics constituted by lenses may be used instead. Alternatively, the image forming unit 15 may be a combination of the reflection optics and the refraction optics.

While the image forming unit 15 makes the image light beams 100 (101, 102, 103) forming a virtual image generated by the HUD device 1 in the vertical direction cross with each other between the image forming unit 15 and the second reflector 16 in the first and second embodiments, the image forming unit 15 may make the image light beams 100 (104, 105, 106) forming the virtual image generated by the HUD device 1 in the horizontal direction cross with each other between the image forming unit 15 and the second reflector 16. In this case, the light distribution adjustment unit 12 (22) according to the first and second embodiments makes the illumination light beams 201, 202, 203 enter the display 14 (24) so that the principal rays of the illumination light beams 201, 202, 203 scatter in the first direction Y, and makes the illumination light beams 204, 205, 206 enter the display 14 (24) so that the principal rays of the illumination light beams 204, 205, 206 converge in the second direction X.

Figure 8:
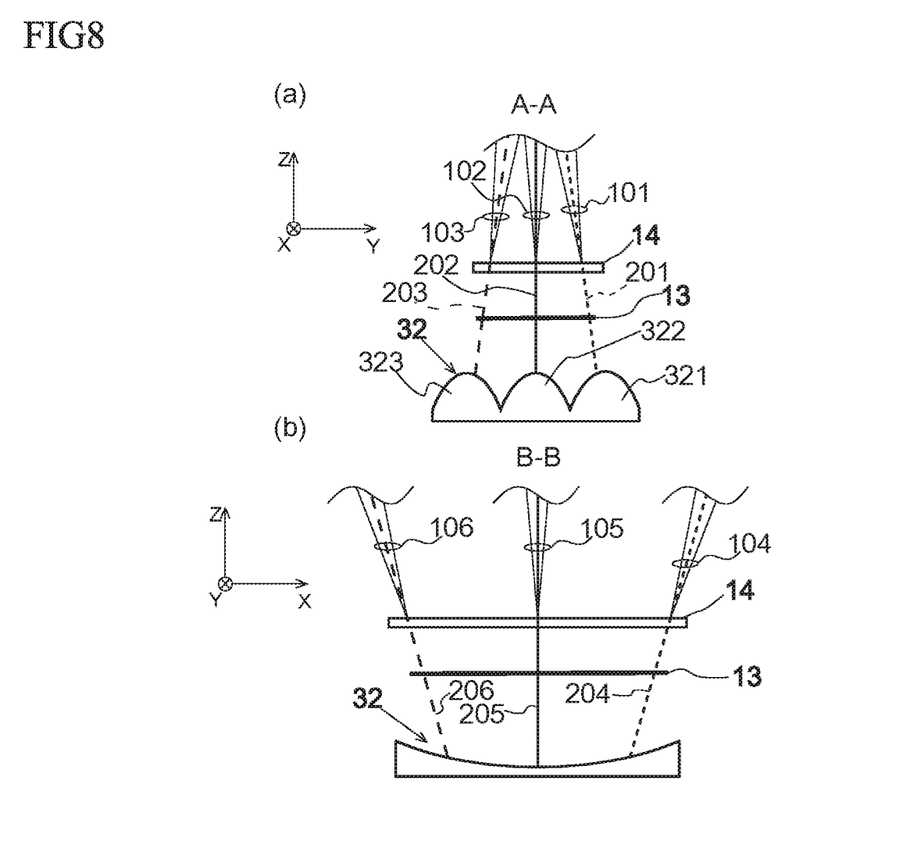

While the light sources 11 (21) are arranged in a matrix, that is, in a plurality of rows in the first direction Y and in a plurality of rows in the second direction X in the first and second embodiments, the light sources 11 (21) may be linearly arranged in a row in the first direction Y or in the second direction X. When such a linear arrangement of the light sources 11 is applied to the first embodiment, for example, the light sources 11 are arranged in a row along the second direction X. As shown in FIG. 8(a), in the lens array 32, a plurality of rows of convex lenses 321, 322, 323 are arranged in the first direction Y. As shown in FIG. 8(b), these lenses 321 (322, 323) may be formed in a concave shape in the second direction X. Alternatively, the light source 11 (21) may be provided in single.

While the light source 11 (21) has a reduced area of emitting the illumination light beam 200, like an LED, in the first and second embodiments, a surface light source using organic EL may be employed.

While the first and second embodiments have described an example in which the display surface of the display 14 (24) is flat, the display surface of the display 14 (24) for use in the HUD device 1 according to the present invention may be curved. When the display surface of the display 14 (24) is curved, the coordinate system used in the above description is defined in a manner that the first direction vertical to the optical axis of the image light beam 100 emitted from the display 14 (24) is the Y axis, the direction vertical to the optical axis of the image light beam 100 emitted from the display 14 (24) and orthogonal to the first direction Y is the X axis, and the direction orthogonal to the first direction Y and the second direction X is the Z axis.

The light distribution adjustment unit 12 may be formed by individually disposing the condenser lenses 121 to 129.

The light distribution adjustment lens 222 according to the second embodiment may be, as needed, a rotationally symmetric lens or a toroidal lens having a spherical or aspherical surface.

While the light distribution adjustment unit 22 (the light distribution adjustment lens 222) is constituted by lenses in the second embodiments, mirrors may be used instead.

While the display 14 (24) is disposed to be vertical to the optical axis of the image light beam 100 traveling to the eye box 3 in the above embodiments, the display 14 (24) may be rotated about the first direction Y and/or the second direction X to be inclined to the optical axis of the image light beam 100 traveling to the eye box 3.

The reflective-transmissive surface on which the image light beam 100 is projected is not limited to the window shield 2 of a vehicle. The reflective-transmissive surface on which the image light beam 100 is projected may be, for example, a dedicated combiner member.

INDUSTRIAL APPLICABILITY

The present invention is applicable to a head-up display device mounted on a vehicle.

DESCRIPTION OF REFERENCE NUMERALS

1: HUD device (head-up display device)
2: Window shield
3: Eye box
10: Display device
11: Light source
12: Lens array (light distribution adjustment unit)
13: Diffusion plate
14: Display
15: First reflector (image forming unit)
16: Second reflector
17: Casing
20: Display device
21: Light source
22: Light distribution adjustment unit
23: Diffusion plate
24: Display
32: Lens array
100: Image light beam
121 to 129: Condenser lens
200: Illumination light beam
221: Exit pupil magnifier
222: Light distribution adjustment lens
M1: Display image
M2: Intermediate image X: Second direction
Y: First direction
Z: Third direction
dH1: Fourth pitch
dHA: Third pitch
dV1: Second pitch
dVA: First pitch

The invention claimed is:

1. A head-up display device comprising:
a light source that emits an illumination light beam;
a display that receives the illumination light beam on a rear surface and emits an image light beam having been modulated from a front surface, the image light beam propagating along an optical axis;
a light distribution adjustment unit that is disposed between the light source and the display, the light distribution adjustment unit configured to refract or reflect the illumination light beam toward the display, to converge the illumination light beam toward the optical axis, and to allow the image light from the display to converge toward the optical axis;
an image forming unit that images the image light beam emitted from the display; and
a reflector that reflects the image light beam having passed through the image forming unit to a transmissive reflector disposed in front of a viewer,
wherein the light distribution adjustment unit includes a light distribution adjustment lens that has a positive refractive power in a direction along a first direction and a negative refractive power in a direction along a second direction orthogonal to the first direction, and
wherein the light distribution adjustment unit includes:
a first light distribution adjustment lens that has a positive refractive power in a direction along the first direction; and
a second light distribution adjustment lens that has a negative refractive power in a direction along a second direction orthogonal to the first direction.

2. The head-up display device according to claim 1, wherein the light distribution adjustment unit makes the illumination light beam enter the display as scattering light in the second direction orthogonal to the first direction.

3. The head-up display device according to claim 2, wherein
the light source includes a plurality of light sources that are arranged in a first pitch in the first direction, and
the light distribution adjustment unit includes a plurality of condenser lenses that are arranged in a second pitch smaller than the first pitch in the first direction so as to correspond to the light sources, and that receive a plurality of the illumination light beams emitted from the light sources.

4. The head-up display device according to claim 3, wherein
the light source includes a plurality of light sources that are arranged in a third pitch in a second direction orthogonal to the first direction, and
the light distribution adjustment unit includes a plurality of condenser lenses that are arranged in a fourth pitch larger than the third pitch in the second direction so as to correspond to the light sources, and that receive a plurality of the illumination light beams emitted from the light sources.

* * * * *